A. T. PETERSON.
ASH PAN.
APPLICATION FILED MAR. 20, 1918.
1,278,736.
Patented Sept. 10, 1918.
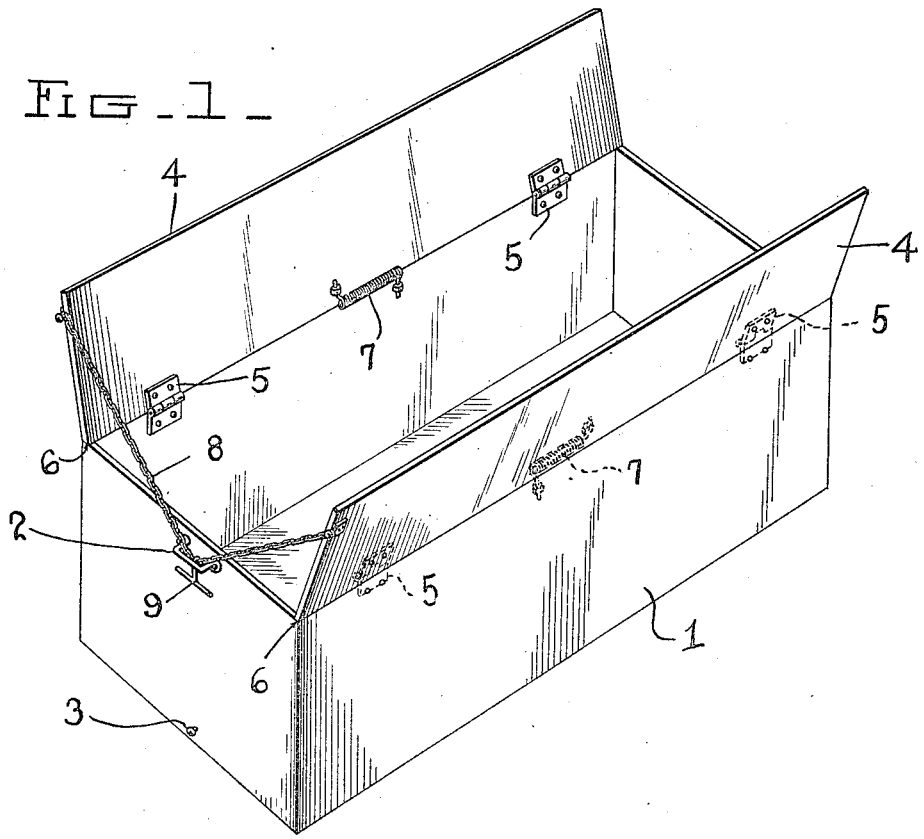
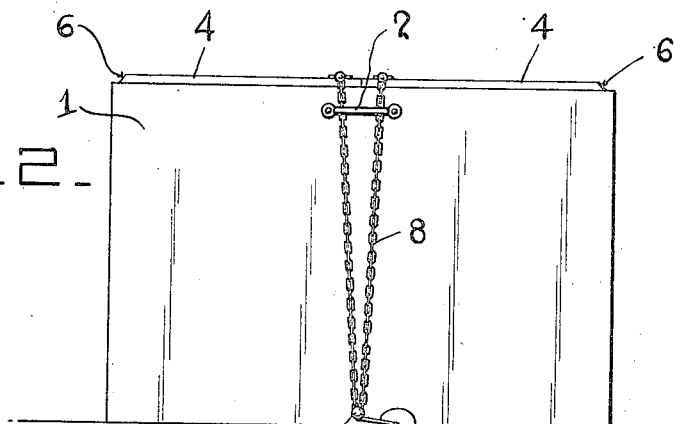
Witnesses
L. B. James
L. Wilcox
Inventor
A. T. Peterson
By Victor J. Evans
Attorney

UNITED STATES PATENT OFFICE.

ALBERT T. PETERSON, OF MAHTOWA, MINNESOTA.

ASH-PAN.

1,278,736.      Specification of Letters Patent.      Patented Sept. 10, 1918.

Application filed March 20, 1918. Serial No. 223,618.

*To all whom it may concern:*

Be it known that I, ALBERT T. PETERSON, a citizen of the United States, residing at Mahtowa, in the county of Carlton and State of Minnesota, have invented new and useful Improvements in Ash-Pans, of which the following is a specification.

This invention relates to ash pans or receptacles and it consists in the novel features hereinafter described and claimed.

An object of the invention is to provide an ash pan adapted to be used in stoves, furnaces or the like where the pit of the ash pan containing compartments is of greater dimensions than the pan permitted to be received therein.

A further object of the invention is the provision of a pan as stated provided with means which, when the pan is arranged in a pit of greater dimension, may be positioned to bridge the space intervening the outer surface of the pan and the inside surface of the pit, such means being adapted when in position to guide ashes dropping from the grate, into the pan, and hence to prevent the accumulation of ashes in the pit in such intervening space, as usually occurs in stoves or furnaces of ordinary construction.

With the above objects in view the pan comprises a body which is preferably rectangular in plan and having spring pressed wings hingedly mounted at its opposite edges. The hinges are arranged at the inner surfaces of the sides of the pan and consequently when the wings are open they may swing outwardly beyond the outer surfaces of the sides of the pan and the wings are provided with beveled edge portions which are adapted to limit the outward swinging movement thereof. A chain is connected with the free edge portions of the wings and also is trained through a guide mounted at the end of the pan and may be pulled whereby the wings are swung in over the pan and the contents thereof.

In the accompanying drawings:

Figure 1 is a perspective view of the ash pan.

Fig. 2 is an end view of the same.

The ash pan comprises a rectangular body 1 of metal or other suitable material and which is provided at one end with a guide 2 and a stud 3. Wings 4 are hingedly mounted at the upper edges of the sides of the body 1 and the hinges 5 which connect the wings with the body are attached to the inner surfaces of the wings and the inner surfaces of the sides of the body 1. The lower edges of the wings 4 are beveled at their outer portions as at 6 and these beveled surfaces are adapted to encounter the upper edges of the sides of the body whereby the outward swinging movement of the wings 4 with relation to the body 1 is limited. Springs 7 are connected at one end with the sides of the body and connected at their other ends with the wings 4 and are under tension with a tendency to normally swing the wings 4 to open position with relation to the body 1.

A chain 8 is connected at its end with the free edge portions of the wings 4 and the intermediate portion of the said chain 8 is trained through the guide 2. A handle member 9 is attached to the intermediate portion of the chain 8 and is of a size which will prohibit the same from passing through the guide 2. When the chain 8 is drawn in a downward direction and the intermediate portions thereof is caught under the stud 3 the wings 4 are swung to closed positions and held at such positions over the body 1 of the pan.

It is apparent that when the pan is inserted in the ash pit of a stove or furnace and the chain 8 is disconnected from the stud 3 the springs will hold the wings 4 at open position above the edges of the sides of the body 1 and these wings will bridge the spaces between the sides of the pan and the sides of the ashpit and the ashes which drop from the grate and fall upon the wings are directed by the same into the body 1. When it is desired to remove the ash pan from the pit the chain 8 is drawn in a downward direction and caught under the stud 3 whereby the wings 4 are swung to closed position over the body 1 and the contents thereof and therefor the pan may be readily removed from the ash pit without spilling the ashes or permitting the same to blow about the vicinity of the stove or furnace.

In view of the fact that the wings 4 are provided at their inner edge and at their outer surfaces with the beveled surfaces 6 the said surfaces may rest upon the upper edges of the sides of the body 1 when the wings are extended and consequently the springs 7 can only open the wings 4 to an extent whereby the beveled surfaces 6 will engage the edges of the sides of the body and consequently the chain 8 is not subjected to strain when the wings are in open position. Furthermore the said beveled surfaces 6 permit the wings 4 to open to maximum extent and the joint between the inner edges of the wings and the upper edges of the sides of the body are closed and the ashes cannot pass between the wings and the edges of the sides of the body when the wings are in open position.

From the foreging description taken in conjunction with the accompanying drawings it will be seen that an ash pan of simple and durable structure is provided and that the same may be used to advantage for collecting and removing ashes from the pit of a stove or furnace.

Having described the invention what is claimed is:

An ash pan comprising a body, wings hingedly connected with the sides of the body, said wings being provided at their inner edges and outer portions with beveled surfaces adapted to encounter the edges of the sides of the body, springs for moving and holding the wings at open position, a guide mounted upon the outer surface of the end of the body, a stud mounted upon the same surface of the body below the guide, a chain trained through the guide and adapted to engage the stud and being connected at its end with the free edge portions of the wings, and a handle attached to the intermediate portion of the chain and being larger than the opening through the guide.

In testimony whereof I affix my signature.

ALBERT T. PETERSON.

Copies of this patent may be obtained for five cents each, by addressing the "Commissioner of Patents, Washington, D. C."